United States Patent Office.

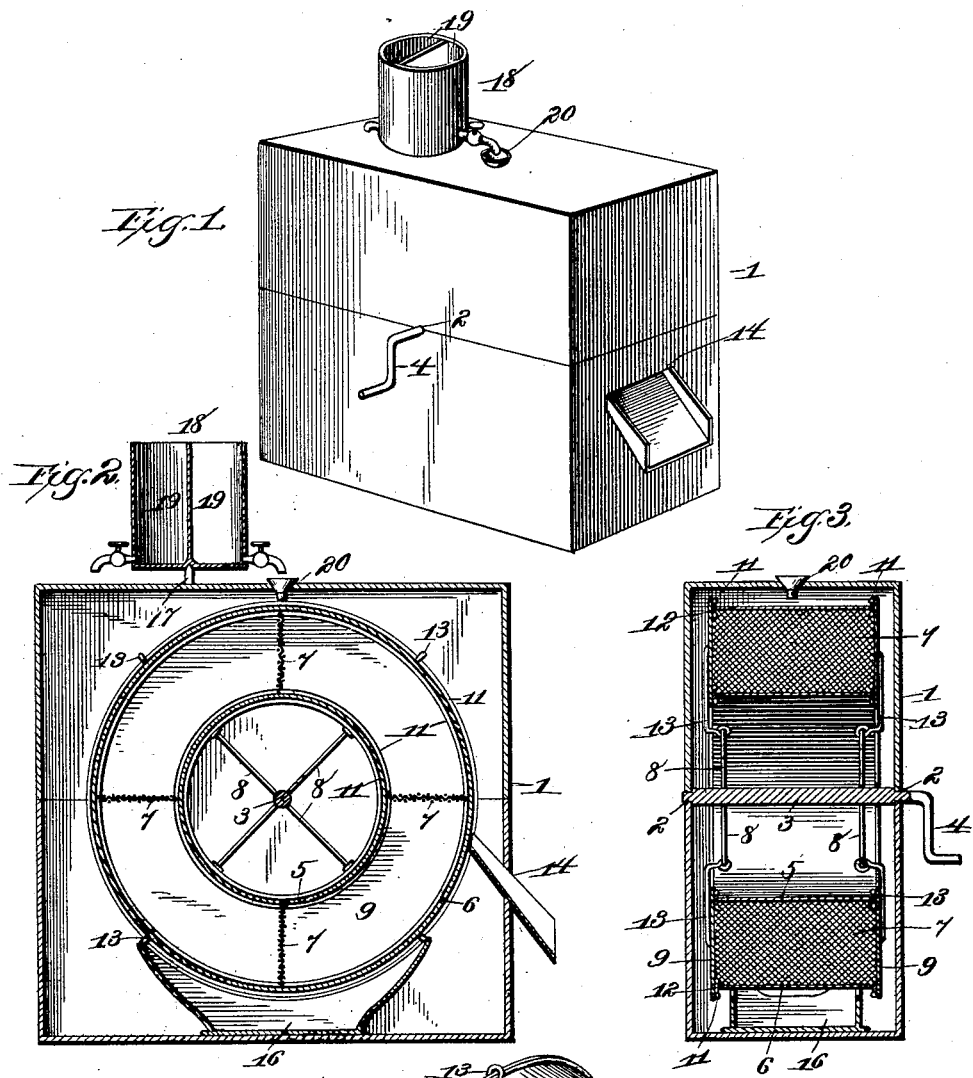

CHARLES T. VAN SICKLEN, OF ENGLEWOOD, ILLINOIS.

ICE-CREAM FREEZER.

SPECIFICATION forming part of Letters Patent No. 483,028, dated September 20, 1892.

Application filed November 16, 1891. Serial No. 412,103. (No model.)

*To all whom it may concern:*

Be it known that I, CHARLES T. VAN SICKLEN, a citizen of the United States, residing at Englewood, in the county of Cook and State of Illinois have invented a new and useful Ice-Cream Freezer, of which the following is a specification.

My invention has reference to improvements in that class of ice-cream freezers employing a refrigerating-cylinder, upon whose surface the cream is frozen and subsequently removed by scraping.

The objects of my invention are to provide a cylinder for refrigerative purposes so constructed as to be cheap and simple, as well as durable, and adapted to maintain the freezing agent in close contact with the freezing-surface of the cylinder, and, furthermore, to provide for a retention of the freezing agent entirely around the wall of the cylinder and prevent the same from falling to the bottom thereof as the cylinder revolves, whereby I obviate the wear and tear upon the cylinder that would otherwise occur if the refrigerating agent was permitted to slush from side to side of the same.

With the above and other objects in view the invention consists in certain features of construction hereinafter specified, and particularly pointed out in the claims.

Referring to the drawings, Figure 1 is a perspective of a freezer constructed in accordance with my invention. Fig. 2 is a longitudinal section. Fig. 3 is a transverse section. Fig. 4 is a detail in perspective of the cylinder.

Like numerals of reference indicate like parts in all the figures of the drawings.

1 designates the outer casing or box, which is provided at opposite sides with bearing-openings 2, that are formed in the meeting edges of the upper and lower sections composing the box, the upper section serving as a removable cover for the lower section, as will be evident. A shaft 3 is journaled in the bearing-openings and terminates outside of the same, where it is provided with an operating-crank 4. The freezing-cylinder is formed of sheet metal and consists of inner and outer cylindrical walls 5 and 6, respectively, which walls are spaced apart by means of radial wire partitions 7, located at intervals throughout the annular space formed by the two walls. The inner wall is supported upon the shaft by means of braces or spokes 8, which radiate from the shaft, as shown. The opposite ends of the cylinder are closed by means of a pair of annular caps or covers 9, provided at their edges with encircling wire rings 10, designed to fit over the inner and outer walls composing the cylinder.

Soldered or otherwise secured to the caps or covers, a short distance from the rings 10 thereof, are inner wire rings 11, and upon each of the same and extending to the the adjacent rings 10 are rubber packing-rings 12, said latter rings being bound snugly against the edges of the walls of the cylinder and serving as a means for forming tight joints between said edges and the covers. Each of the covers is provided with clamps 13, by which they are retained in position.

In an opening 14, formed in the front wall of the box 1, a combined scraper and delivery-blade is located, the same being inclined and designed to scrape the frozen substance from the outer surface of the external annular wall and deliver the same into waiting receptacles.

Under the cylinder, within the box, a tray or can 16 is located to receive any of the frozen substance that may fall therefrom or such substance as may not be thoroughly frozen, and thus avoid the scraping-blades.

Upon the upper section or cover of the box, upon a pivot 17, is located a supply-receptacle 18, said receptacle being divided in this instance into several compartments 19, each having a faucet leading therefrom, and which by the revolutions of the receptacle may be brought opposite an opening 20, formed in the box-lid directly over the freezing-cylinder.

In operation the several compartments of the receptacle are filled with various flavors of cream, water-ices, or custards and the receptacle revolved until the faucet of that compartment containing the desired substance to be frozen is in register with the opening 20 of the box. The freezing-cylinder has in the meantime by the removal of one of the caps or covers been filled with crushed ice and the caps or covers replaced, after which the apparatus is in condition for operation. By regulating the faucet the desired flow of substance may be obtained. It now simply remains to revolve the cylinder through the medium of the crank, and the substance during a partial revolution of the cylinder becomes frozen upon the surface thereof and is scraped therefrom by the inner edge of the scraping and delivery blade, down which latter it readily passes into any receptacle placed thereunder. In this manner desired quantities of substance may be frozen and various flavors be obtained simply by partially revolving the feeding-receptacle, so as to bring any of the various faucets opposite the opening 20.

It will be seen that it takes comparatively little ice to fill the freezing-cylinder, and that said ice is brought adjacent to the freezing-point, and, furthermore, that the sloshing of the ice by the revolutions of the cylinder and the falling from top to bottom thereof, so as to leave the top normally unprovided, is avoided by the wire screens located at intervals in the annular space formed by the two walls.

It will be evident that the feeding-receptacle may not be divided and that the opposite heads of the cylinder need not be removable, in which latter case a suitable opening provided with a removable cover will be formed in said heads or covers.

The clamps 13 are of hook shape, one being employed for and connected pivotally at its inner end to each of the spokes. When the covers are in position, the hooks are swung outwardly, and, being eccentrically pivoted with relation to the periphery of the cylinder, bind or clamp thereon, thus locking the covers.

Having described my invention, what I claim is—

1. In an ice-cream freezer, a freezing-cylinder consisting of an inner and outer annular wall, annular removable heads for the cylinder, a shaft, bearings for the shaft, and spokes radiating from the shaft and connected with the inner wall, substantially as specified.

2. In an ice-cream freezer, the freezing-cylinder consisting of inner and outer annular walls, opposite annular heads for the same, partitions connecting the walls at intervals, a shaft, bearings for the shaft, and spokes between the shaft and inner wall, substantially as specified.

3. In an ice-cream freezer, the freezing-cylinder consisting of inner and outer annular walls, opposite annular heads for the same, reticulated wire partitions connecting the walls at intervals, a shaft, bearings for the shaft, and spokes between the shaft and inner wall, substantially as specified.

4. In an ice-cream freezer, a freezing-cylinder consisting of inner and outer annular walls, opposite annular heads having inner and outer wire rings, rings secured to the ends adjacent to each of the former rings, rubber packing-rings located between the wire rings, clamps for the heads, a central shaft, and spokes between the shaft and inner cylinder, substantially as specified.

5. In an ice-cream freezer, the combination, with the double cylinder, its shaft, spokes, and annular covers, of the series of hook-shaped clamps pivoted to the spokes and adapted at their free ends to clamp upon the outer edge of the cylinder, substantially as specified.

In testimony that I claim the foregoing as my own I have hereto affixed my signature in the presence of two witnesses.

CHARLES T. VAN SICKLEN.

Witnesses:
HENRY S. SANDERSON,
J. B. LEWIS.